Oct. 10, 1939.   W. W. GLEASON   2,175,459
MACHINE FOR PRODUCING MODIFIED TYPES OF UPHOLSTERY SPRINGS
Filed July 1, 1938   6 Sheets-Sheet 1

Inventor:
William W. Gleason.
By: Rudolph M. Lotz
Attorney.

Oct. 10, 1939.  W. W. GLEASON  2,175,459
MACHINE FOR PRODUCING MODIFIED TYPES OF UPHOLSTERY SPRINGS
Filed July 1, 1938   6 Sheets-Sheet 3

Inventor:
William W. Gleason,
By:
Rudolph Wm Lotz
Attorney.

Oct. 10, 1939.   W. W. GLEASON   2,175,459
MACHINE FOR PRODUCING MODIFIED TYPES OF UPHOLSTERY SPRINGS
Filed July 1, 1938   6 Sheets-Sheet 4
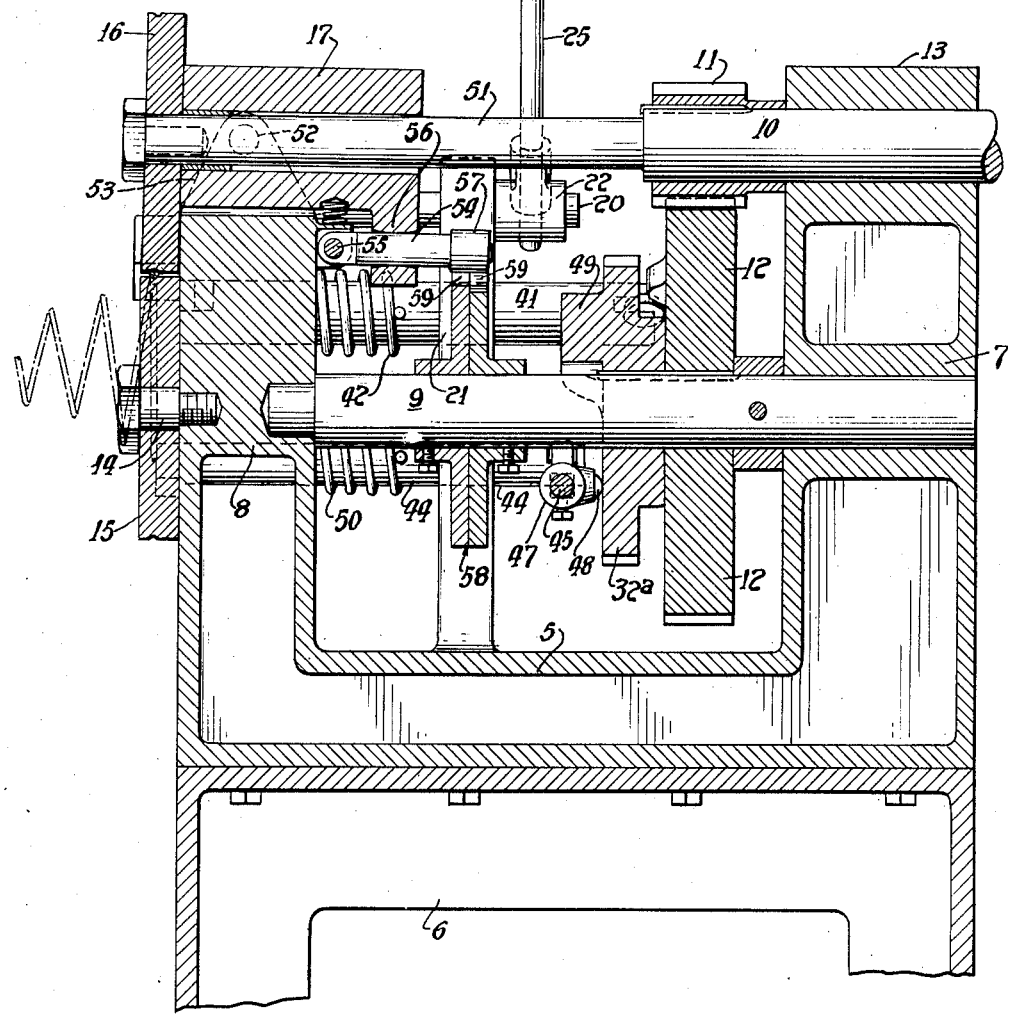
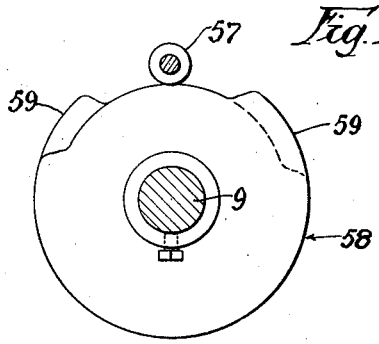
Inventor:
William W. Gleason,
By:
Attorney.

Oct. 10, 1939. W. W. GLEASON 2,175,459
MACHINE FOR PRODUCING MODIFIED TYPES OF UPHOLSTERY SPRINGS
Filed July 1, 1938 6 Sheets-Sheet 5

Inventor:
William W. Gleason,
By:
Attorney.

Oct. 10, 1939.  W. W. GLEASON  2,175,459
MACHINE FOR PRODUCING MODIFIED TYPES OF UPHOLSTERY SPRINGS
Filed July 1, 1938  6 Sheets-Sheet 6
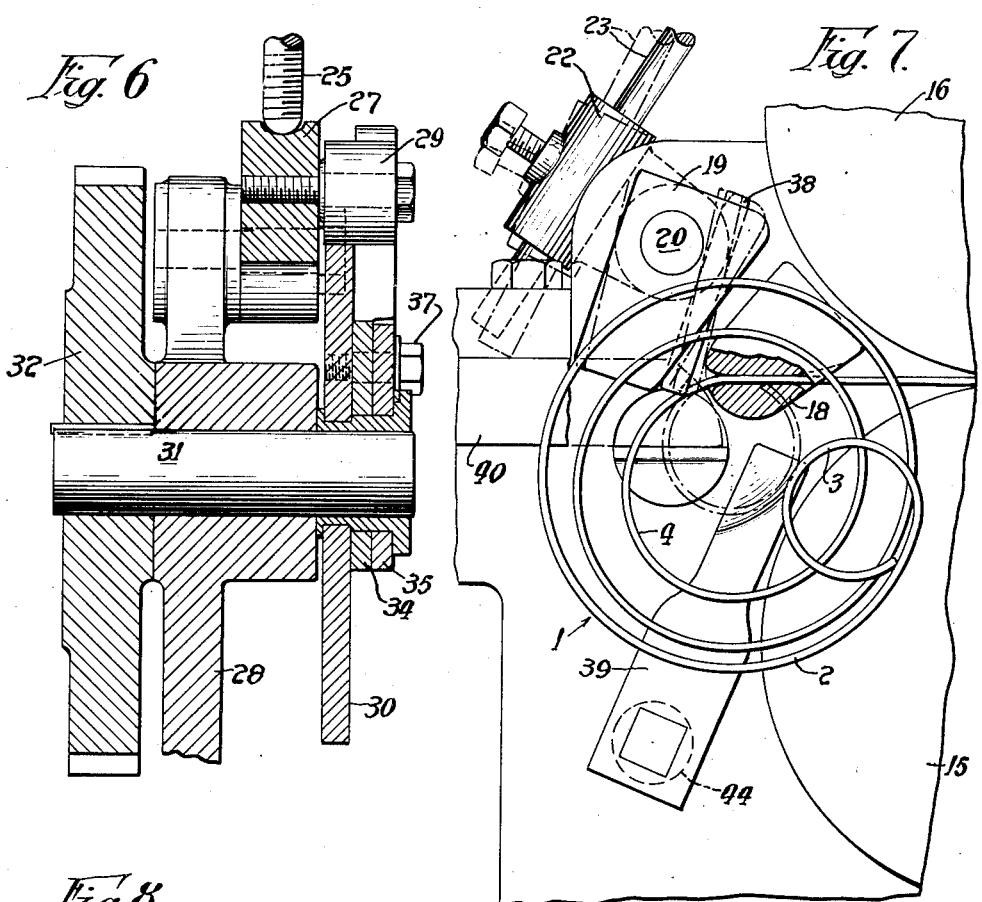
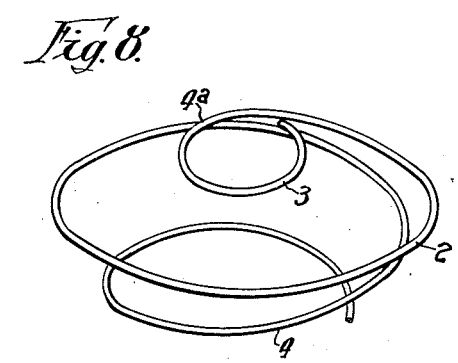
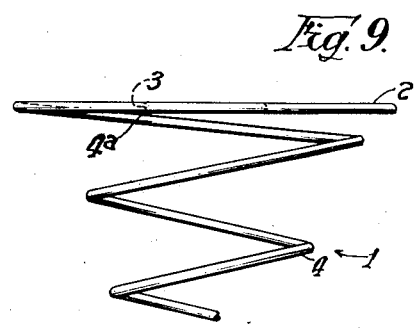
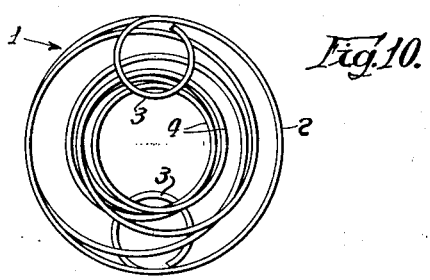
Inventor:
William W. Gleason,
By: Rudolph Wm. Lotz
Attorney.

Patented Oct. 10, 1939

2,175,459

UNITED STATES PATENT OFFICE 2,175,459

MACHINE FOR PRODUCING MODIFIED TYPES OF UPHOLSTERY SPRINGS

William W. Gleason, Chicago, Ill., assignor to Nachman Springfilled Corporation, Chicago, Ill., a corporation of Illinois Application July 1, 1938, Serial No. 216,907

7 Claims. (Cl. 140—79)

The present invention relates to improvements in machines for producing upholstery springs and has for its main object to provide a machine of this type which will produce upholstery springs of modified forms in a single operation or cycle of operations of the machine, thereby to eliminate hand operations heretofore required to produce springs of the type to which reference is had.

A further object of the invention is to provide a machine of the type specified which is readily adjustable to vary the size of terminal loops of the springs and vary their positions relatively to the axis of the spring.

A suitable embodiment of the invention is illustrated in the accompanying drawings, wherein:

Fig. 4 is a vertical longitudinal sectional view of the same on the line 4—4 of Fig. 1.

Fig. 6 is a fragmentary detail vertical sectional view taken on the line 6—6 of Fig. 3.

Fig. 7 is a fragmentary detail front elevation on an enlarged scale, shown partly in section.

Fig. 8 is a fragmentary detail perspective view of an end portion of a spring produced by the machine.

Fig. 9 is a fragmentary side elevation of the portion of said spring shown in Fig. 7.

Fig. 10 is an end elevation of the whole spring shown in Figs. 7 and 8.

Fig. 11 is a detail view in elevation of an adjustable cam of the machine.

Figure 1:
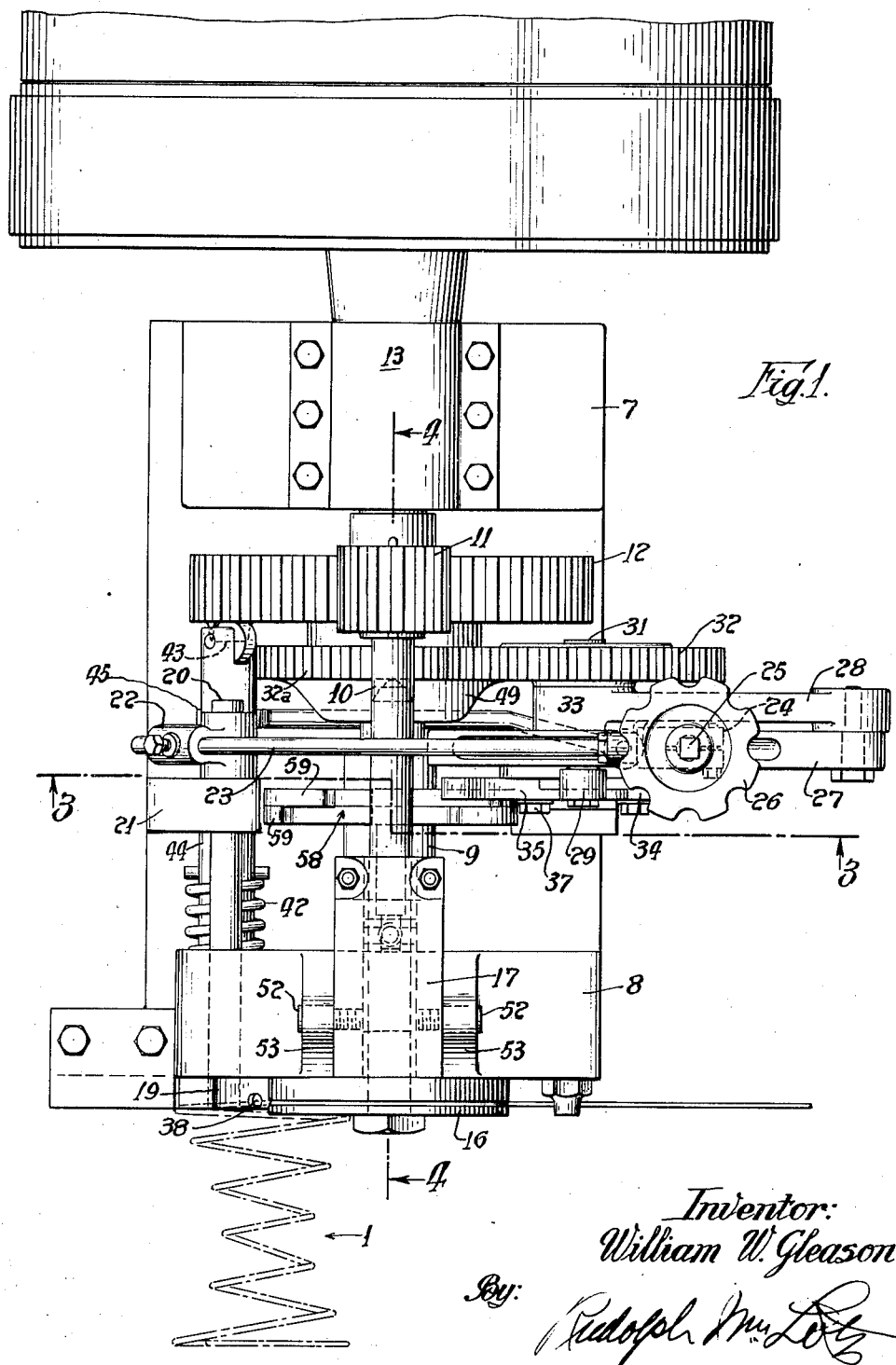
Fig. 1 is a top plan view of a machine constructed in accordance with the invention.

Reference is had first to Figs. 8, 9 and 10 of the drawings which illustrate an exemplary type of upholstery spring adapted to be produced by the machine of this invention. In the instance illustrated the spring 1 shown in Fig. 10 is of the hour-glass type bodily, the respective terminal coils 2 of said spring being equipped with terminal loops 3 which project inwardly toward the axis of the spring and overlie the smaller diameter coils 4 of said spring. The said loops 3 at opposite ends of the spring are substantially diametrically opposed to each other.

By reference to Fig. 9, it will be noted that the terminal coil 2, including its loop 3, is disposed in a plane perpendicular to the axis of the spring and in Fig. 8 it is clearly shown that the loop 3 is disposed in contact at point 4a' with a point in the next inner coil of the spring.

The purpose of the loops 3 is to effect a better balance in upholstery springs in effecting compression thereof, it being common knowledge in the upholstery art that open (unknotted) springs tend to cant appreciably under the influence of load, the loops of the springs of Figs. 7 to 10 taking the place, substantially, of the knots of knotted springs and being further advantageous in that said loops 3 bear upon the smaller diameter coils of the spring in compressing the latter and thereby effecting appreciably greater balance of the spring than the knotting thereof effects. By "balance", as used above, is meant that the spring will compress more accurately axially than open or knotted springs. A further advantage of a spring of this type is that it offers substantial additional support for upholstery batts.

The machine is in the main of a substantially conventional type, the frame thereof, as shown in Fig. 4, comprising a single casting 5 mounted upon a base 6.

In the front and rear walls of the frame 5, the bearings 7 and 8 for a shaft 9 are formed, said shaft being geared to the drive-shaft 10 by means of the spur-gear pinion 11 on the latter which meshes with the spur gear wheel 12 on the shaft 9, one bearing 13 of the draft shaft 10 being formed in the rear wall of the frame 5.

Rotatably mounted on a stud shaft 14 on the front wall of the frame 5 in axial alignment with the shaft 9 is an annularly grooved wire-feed roll 15 which is idle and co-operates with the similar driven roll 16 driven by the shaft 10. The front bearing 17 of the latter is rocked on its trunnions relatively to the frame 5 by flexing the shaft 10, as hereinafter described, to throw the roll 16 into and out of wire-feeding position, said rolls being normally maintained out of wire-feeding position relatively to the roll 15 by the shaft 10.

Figure 2:
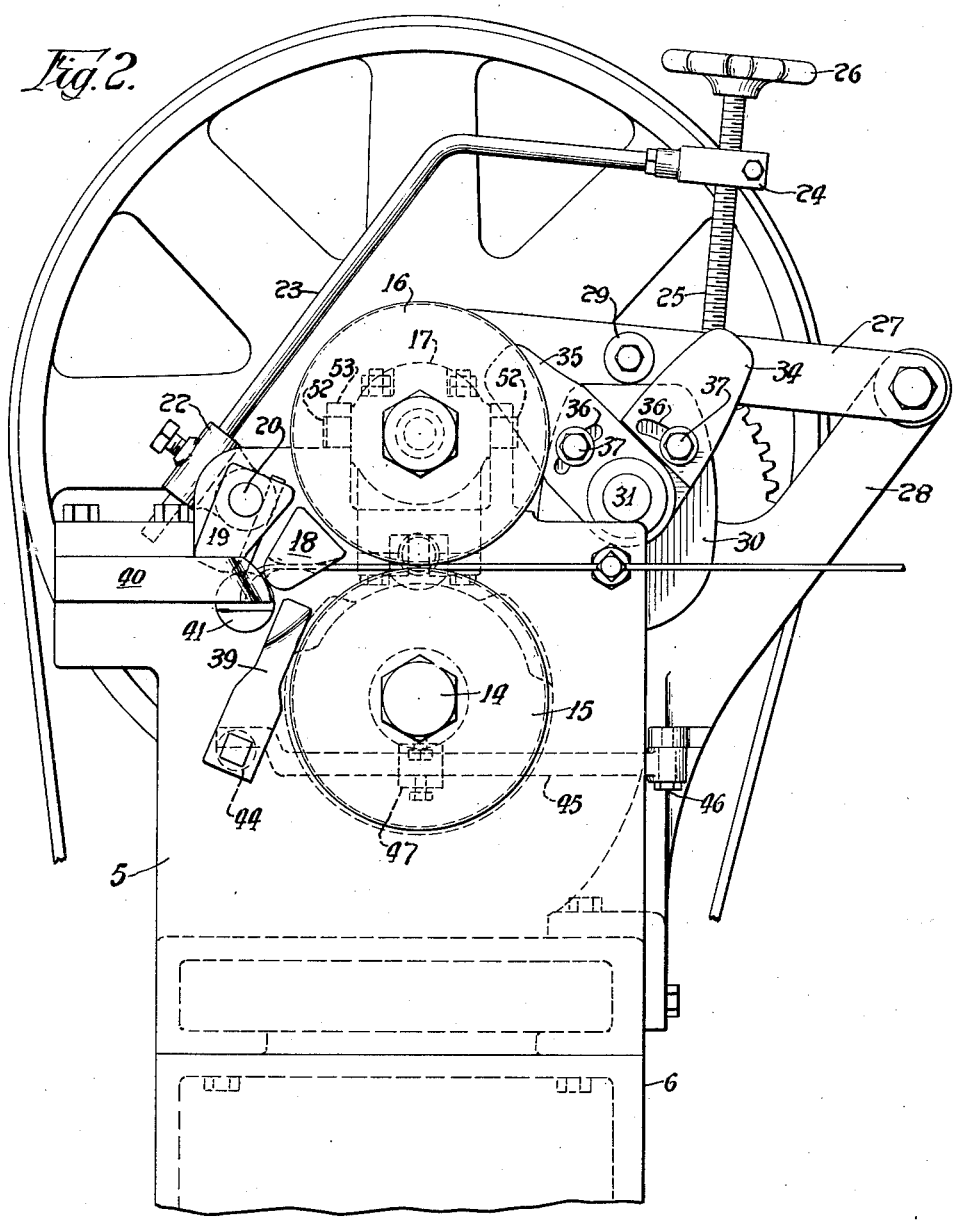
Fig. 2 is a front elevation of the same.
Figure 5:
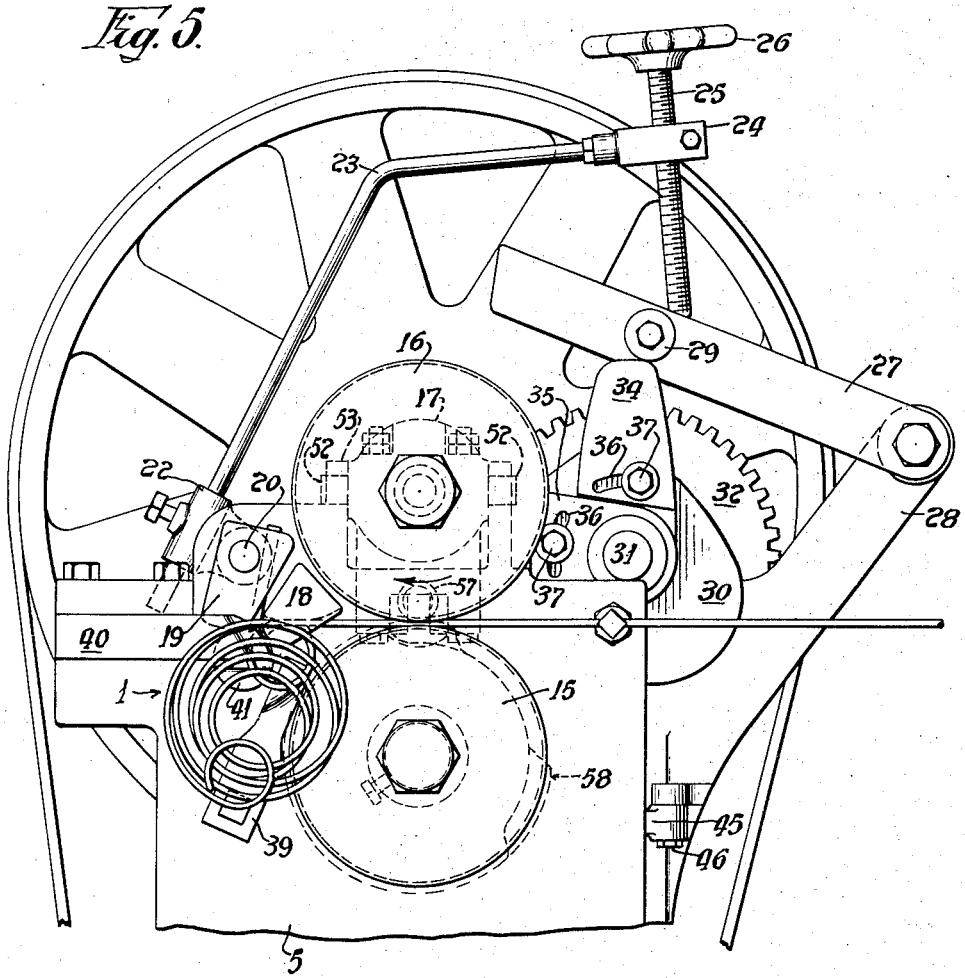
Fig. 5 is a view similar to Fig. 2 showing the operating parts in their position at the instant of cut-off of a completed spring from the wire being fed to the machine.

Referring now to Figs. 2, 5 and 7, it will be seen that the wire is fed by rolls 15 and 16 through an opening in a guide 18 rigid with the front wall of the frame 5. The delivery end of the said opening is flared (Fig. 7) and is opposed to the lower end portion of a rocking cam member 19 which is pivotally secured at its upper end portion to a rock-shaft 20 journalled in a bearing in the front wall of the frame 5 and in a bearing of a bracket arm 21 disposed between the ends of the frame 5.

Rigid with the rock shaft 20 is a collar 22, or sleeve, which receives and is secured to the lower end portion of a rod 23 which is slightly V-shaped and is disposed in a vertical plane perpendicular to the axes of the shafts 9, 10 and 20. At its other end the said rod 23 is equipped with a threaded split clamp collar 24 having threaded engagement with the threaded rod 25 equipped with a hand wheel 26. The lower end of the rod 25 rests in the longitudinal groove in the rocking arm 27 pivotally connected with a bracket arm 28 of the frame 5 opposed, substantially, to the bracket 21 (see Fig. 3).

The said arm 27 is equipped between its ends with an anti-friction roller 29 which rides upon the peripheral surface of an adjustable cam 30. The latter is carried by a shaft 31, parallel with and geared by means of the spur gear wheel 32 meshing with spur-gear wheel 32a to the shaft 9. The bearing 33 for the shaft 31 is shown only in Fig. 1.

The cam 30 comprises a middle substantially elliptical portion which is flat at one end. A pair of arms 34 and 35 are pivotally engaged with the shaft 31 and are equipped with arcuate slots 36 concentric with the shaft 31 and are adjusted relatively to each other and the flat end portion of the cam 30 by means of the set screws 37.

The clockwise rotation of the cam 30 rocks the arm or lever 23 and cam 19. The latter is equipped with a detachable and replaceable hardened steel member 38, the lowermost end portion of which is opposed to the wire guide opening of the member 18 and determines the radius of curvature imparted progressively to the wire. This radius is reduced as the lower end portion of the member 38 approaches the member 18 and increases as the distance between the members 18 and 38 is increased.

The pitch of the spring is determined by the cam member 39 mounted upon the front wall of the frame 5 in the path of the wire in a well known manner which is common to machines of this type.

An anvil member 40 disposed for co-operation with a wire cutting plunger 41 is also mounted upon the front wall of the frame 5.

Figure 3:
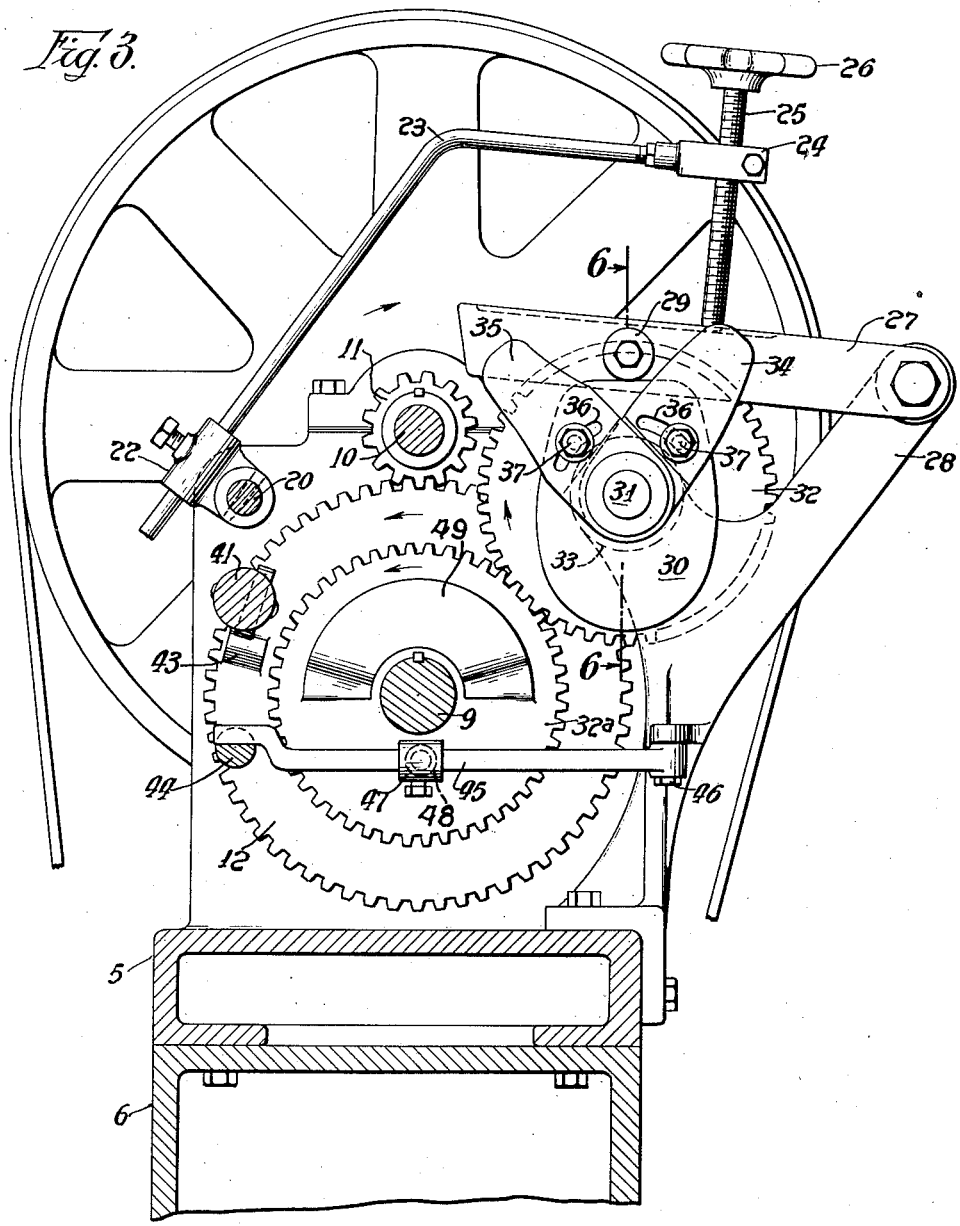
Fig. 3 is a vertical sectional view of the same taken on the line 3—3 of Fig. 1.

The wire passes behind the anvil member 40 and the forward end of the plunger 41 which is maintained retracted by the compression spring 42 until projected into wire cutting position by a cam projection 43 on the front face of the gear wheel 12 which is illustrated in Fig. 3.

The cam member 39 is mounted upon one end of a reciprocable plunger 44 parallel with the shaft 9 and which is actuated in one direction by a rocking arm 45 which is pivotally secured to the bracket arm 28 by means of a vertical pivot member 46. The arm 45 is equipped between its ends with an adjustable collar 47 which carries a ball 48 maintained pressed against the front face of a gear wheel 32a rigid with shaft 9 and which is equipped with an arcuate cam formation 49 in the path of which said ball is disposed, said arm 45 being rocked by said cam to actuate the plunger 44 against the action of the spring 50 (see Figs. 2, 3 and 4).

The reciprocating movement of the cam member 39 causes the pitch of the spring to be greatest midway between its ends, said pitch being decreased more or less gradually toward the respective ends of the spring.

As shown in Fig. 4, the smaller diameter portion 51 of the shaft 10 is flexed to cause the rolls 15 and 16 to engage wire disposed between them by means of imparting to the bearing 17 a tilting motion on the axis of its trunnions 52 which engage in bearings in brackets 53 disposed upon opposite sides of said bearing. The tilting of the said bearing is effected by means of the rocking lever 54 which is pivotally secured at one end to projections of the front wall of the frame 5 by means of the pin 55. The bearing 17 is equipped at its rear end with a projection 56 equipped with an opening through the lever 54 which passes in snug relation between its ends. At its other end the said lever is equipped with an anti-friction roller 57 which rides upon the peripheral face of a cam 58 rigid with the shaft 9.

The said cam 58 (shown in detail in Fig. 11) is composed of a pair of generally circular disks disposed face to face and both of which are adjustably mounted on the shaft 9 for rotation relatively to each other. Each of said disks is equipped with an arcuate peripheral formation 59 of slightly larger diameter than the remainder of the disk, the arcuate length of said larger diameter portions being such that the rolls 15 and 16 can be maintained in wire engaging and feeding relation through an arc of 270 degrees or more, it being obvious that if each of said formations covers an arc of 180 degrees the component disks of the cam 58 may be adjusted relatively to each other to impart to the greater diameter portion of the cam any arcuate length from 180 degrees to 360 degrees maximum, the latter never being required.

In all instances of operation of the machine, the feed of the wire must be interrupted to permit cutting of the wire after each spring is completed and during a period of rest following said cut-off, the said period of rest or interruption of wire feed being always in harmony with the flat end portion of the cam 30 which, ordinarily, is devoid of the cam arms 34 and 35.

The shaft 31, which carries the cam 30, rotates at the same speed as the shaft 9, whereas the shaft 19 rotates at a very much higher speed so that a very long length of wire is fed by the rolls 15 and 16 during each rotation of the shafts 9 and 31, said length of wire being determined by the length of the larger diameter arcuate surface of the cam 58 as determined by the relative positions of the formations 59 thereof, it being obvious that when the roller 57 rides upon the latter, the bearing 17 will be maintained in the tilted or canted position wherein wire feed is effected.

In the instance illustrated in Fig. 5, the roller 29 of the rocking arm or lever 27 is disposed in the position on the end of the cam arm 34 where cut-off of the wire is effected after each spring is substantially completed.

By reference to Fig. 7 it will be readily understood that this cut-off occurs just before the last of the two loops 3 of the spring has been completed, the release of the roll 16 from engagement with the wire being effected an instant after such cut-off.

The continuous rotation of the cam 30 causes the roller 29 to pass from the point shown in Fig. 5 to the point shown in Figs. 2 and 3 which lies substantially midway between the cam arms 34 and 35 and, until the said roller is disposed upon the outermost surface of the cam arm 35 where the next wire feeding operation begins. It is while the roller 29 continues to ride upon the outermost surface of the cam arm 35 that the first of the loops 3 of each spring is formed and it will be readily understood from the drawings that immediately following the completion of the first loop 3, the largest diameter portion of the spring is formed, the cam arm 35 being so shaped that a very sharp drop of the roller 29 occurs immediately beyond the left-hand end of the outermost surface of the arm 35 along the left-hand edge thereof, so that the terminal coil of the spring, which is substantially circular through an arc of about 270 degrees (as shown in Fig. 10) merges rather sharply spirally into smaller diameter coils of the spring.

The arcuate spacing apart of the arms 34 and 35 determines the relative position of coils or loops 3 in the completed spring. In the instance illustrated said loops 3 are diametrically opposed to each other and the arms 34 and 35 are shown in Figs. 2, 3 and 5 to be relatively positioned to cause said loops 3 to be so disposed.

The diameter of the loops 3 may be varied by increasing or decreasing the arcuate lengths of the end surfaces of the arms 34 and 35, by interchanging other arms of different dimensions for those illustrated.

The total length of wire fed to form each spring is determined also by the spacing apart of the arms 34 and 35 and corresponding adjustment of the cam 58.

The axial length and pitch of the spring is determined by the position of the collar 47 on the arm 45, on the one hand, and the projection of the cam face of cam projection 49 from the surface of the gear wheel 32a.

The said arms 34 and 35 are also capable of being so shaped that the spacing of the loops 3 of the springs from the axes of the latter is varied appreciably from that shown in the drawings, as by making the drop of the roller 29 along the left hand face of the arm 35 sharper than shown and its rise along the right hand face of the arm 34 equally sharp. This sharper drop and rise will cause the loops 3 to be spaced farther from the spring axis than is true of those shown in Fig. 10.

The operation of the machine is as follows:

Assume the parts shown in Fig. 3 to be in the position there shown wherein the antifriction roller 29 rests upon the cam 30 between the arms 35 and 34 of said cam, as this is the position of said roller and said cam 30 following completion of one spring and preceding the beginning of production of the next spring, this position being substantially midway of the period wherein feed of wire by the feed rolls 15 and 16 is interrupted, due to the fact that the roller 57 (Fig. 4) now lies midway of the ends of the arcuate recess 59 in the periphery of the dual cam 58.

The shaft 10 driving feed roll 16 rotates constantly at relatively high speed and drives the gear wheel 12 at much lower speed together with cam 58 and cam gear wheel 32a (Fig. 4). The latter drives cam 30 at same speed, clockwise (Fig. 3).

At the instant that cam 58 has moved to the position wherein roll 16 engages the wire between it and roll 15, the cam 30 will have been rotated to the position wherein roller 29 is riding upon the outermost end portion of the cam arm 35, the arm 27 of bracket 28 being thus raised to the upper limit of its movement and thus swinging the lever 23 upon its pivot 20 to the position wherein the member 19 is disposed most closely to the wire guide 18 for cooperation with the latter and the rolls 15—16 to bend the wire to form the small terminal loop at the first formed terminal loop of the spring.

Said loop is formed during rotation of the arm 35 through a very short arc. At the end of this arc of rotation the roller 29 drops precipitately into contact with the substantially elliptical peripheral surface of the cam 30 and causes the arm 27 and lever 23 to be restored substantially to the position of Fig. 3, the member 19 being then spaced farthest from the member 18 and cooperating with the latter to complete the first terminal coil of the spring in a vertical plane because, during this period of operation, the member 39 is disposed at the inner limit of its movement.

By reason of an outward or upward movement of the roller 29 due to increasing radius of the periphery of the cam 30 during the period of formation of said terminal coils, the member 19 will move slightly toward the member 18 and thus cause said coil to be rendered of slightly spiral curvature on a progressively decreasing radius.

At substantially the instant of completion of said terminal coil, the cam gear wheel 32a will have been rotated anticlockwise to the position wherein the ball 48 of plunger 44 is at the bottom of the inclined surface of the left hand end of cam member 49. From this point the rotation of gear wheel 32a causes the arm 45 to swing to project the cam member 39 forwardly to control the helical pitch of the spring which, as shown in Fig. 9, is slightly adjacent the terminal coils and from the time that the ball 48 first reaches the face of the cam formation 49 which is disposed in a vertical plane, and until said face has passed said ball 48, maintains the said pitch uniform and of greater degree. As said cam surface passes the ball 48, the helical pitch of the spring is decreased and the other terminal coil of the spring is formed in a vertical plane.

During the period that the pitch of the spring is determined, as above described, the cam 30 raises the roller 29 gradually until the latter rides upon the highest point or point of greatest radius of said cam 30, thereby causing the member 19 to approach the member 18 to decrease the radii of the successive coils of the spring to the middle of the latter. Thereafter the said roller 29 moves gradually in the opposite direction for progressively increasing the radii of the coils until said roller is engaged by the cam arm 34 which effects a very rapid upward movement of roller 29 to the outermost end of said arm 34 and during the period that the said roller rides upon said outer end of arm 34, the last small diameter terminal loop of the other terminal coil of the spring is formed.

It will be apparent from the position of the cut-off 41 that the cut-off operation is performed prior to completion of the last terminal loop of the spring, the feed of wire being continued after cut-off to complete said loop. The instant of completion of the latter is coincident with interruption of feed of wire by having the arcuate recess of cam 58 reach the roller 57.

The cut-off mechanism is, as hereinbefore described, effected by the cam projection 43 of wheel 12 acting upon the roller at the inner end of the cut-off plunger 41.

I claim as my invention:

1. In a machine of the type specified comprising automatic wire severing means and feeding means, an adjustable cam associated with the feed and severing means for controlling the length of wire fed precedent to each actuation of the severing means, wire forming means interposed between the feeding and severing means, a second cam controlling the forming means and including formations thereon for actuating said forming means to produce a small diameter loop at each end of the wire and forming the remainder of the wire to produce a desired article equipped with said loops.

2. In a machine of the type specified, the combination with mechanism feeding, forming and severing a given length of wire from a long length thereof to produce the springs successively, said mechanism including a cam cooperating with said forming means to determine the radii of the several coils of the springs and a formation on said cam cooperating with said forming means to cause the latter to form a small diameter loop at an extremity of the spring other than a coil of said spring.

3. In an upholstery spring forming machine, the combination with mechanism feeding, forming and severing a given length of wire from a long length thereof to produce the springs successively, said mechanism including a cam cooperating with said forming means to determine the radii of the several coils of the springs and formations on said cam cooperating with said forming means to cause the latter to form small diameter loops other than coils of the spring at the extremities of the latter.

4. In an upholstery spring forming machine, the combination with mechanism feeding, forming and severing a given length of wire from a long length thereof to produce the springs successively, said mechanism including a cam cooperating with said forming means to determine the radii of the several coils of the springs, and a formation on said cam cooperating with said forming means to cause the latter to form a small diameter inwardly projecting loop other than a coil of the spring at one extremity of the latter.

5. In an upholstery spring forming machine, the combination with mechanism feeding, forming and severing a given length of wire from a long length thereof to produce the springs successively, said mechanism including a cam cooperating with said forming means to determine the radii of the several coils of the springs and formations on said cam cooperating with said forming means to cause the latter to form small diameter inwardly projecting loops other than coils of the spring at the extremities of the latter.

6. In an upholstery spring forming machine, the combination with mechanism feeding, forming and severing a given length of wire from a long length thereof to produce the springs successively, said mechanism including a cam cooperating with said forming means to determine the radii of the several coils of the springs and an adjustable projection on said cam for actuating said forming means to cause the latter to form a small diameter terminal loop other than a coil of the spring at either selected extremity of the latter.

7. In an upholstery spring forming machine, the combination with mechanism feeding, forming and severing a given length of wire from a long length thereof to produce the springs successively, said mechanism including a cam cooperating with said forming means to determine the radii of the several coils of the spring, and a pair of adjustable projections on said cam for actuating said forming means to cause the latter to form small diameter terminal loops other than coils of the spring at both extremities of the latter.

WILLIAM W. GLEASON.